United States Patent Office 2,889,201
Patented June 2, 1959

2,889,201

PROCESS FOR THE MANUFACTURE OF HYDROGEN CYANIDE

Juro Horiuti, Toyohira-Machi, Sapporo-gun, Hokkaido, Toshio Sato, Sapporo-shi, and Kazuhiko Ishizuka, Suisha-Machi, Sapporo-shi, Japan No Drawing. Application March 12, 1957
Serial No. 645,408

Claims priority, application Japan March 13, 1956

4 Claims. (Cl. 23—151)

The present invention relates to a process for the manufacture of hydrogen cyanide by an improved method and relates also to a process of regenerating the inactivated catalyst used therefor.

One object of the present invention is to provide an improved process for raising the yield of hydrogen cyanide in the manufacture of same from carbon monoxide and ammonia under pressure, high space velocity and relatively low temperature up to nearly the equilibrium composition. Another object of the present invention consists in avoiding decomposition of reactant and resultant gas in spite of the high pressure and temperature applied. Another object is to easily regenerate the catalyst employed in the process when the same is spent.

For the manufacture of hydrogen cyanide it is already known that carbon monoxide and ammonia are led over metal oxides, for example alumina, thoria, urania, magnesia and zinc oxide, at an elevated temperature of over 400° C. It is also known that ammonia, charcoal and metal sodium are allowed to react with each other at above 1,000° C. to obtain sodium cyanide (Castner), or that ammonia and methane are catalytically combined at above 900° C. to yield hydrogen cyanide, or that methane or other hydrocarbons, oxygen or air, together with ammonia are catalytically combined over platinum or platinum-contacts.

The aforementioned first method is, however, better than the other methods, because the raw materials used are cheaper and on account of relatively low reaction temperature the materials of construction of the reactor are easily obtainable.

Likewise, the first method, whereby hydrogen cyanide may be manufactured continuously at large scale, surpassed the intermittent method, whereby the same is prepared from carbon monoxide and ammonia by way of formamide as intermediate product. However, the direct synthesis of hydrogen cyanide is still subject to many disadvantages. The main defect consists in the fact that the reaction ratio of carbon monoxide is highly unfavorable, because a large excess of carbon monoxide is needed to maintain a good yield of hydrogen cyanide with regard to ammonia (conversion ratio of ammonia to hydrogen cyanide after once passing the starting gas). Now it has become possible to raise the yield a little by a well known method by means of which liberated hydrogen is removed from carbon monoxide and the latter again led to the circulation. (This process is referred to for convenience "the usual manner of synthesis" or simply "the usual synthesis" hereinafter.)

The usual manner of synthesis is, however, not favorable for mass production, because the space time yield is still too low. At elevated pressure, the yield is raised as is well known. Nevertheless, at relatively high temperature, which is preferably applied in the usual synthesis, there takes place remarkable decomposition of ammonia under pressure. The decomposition product (nitrogen) is accumulated in the circulation and as a result the circulating gas must be then blown out in the air. This means of course a poor utilization of carbon monoxide.

In accordance with the present invention the disadvantages of the prior art are remarkably removed and hydrogen cyanide may be manufactured economically. The main feature of the present process comprises passing a gas mixture mainly consisting of ammonia and carbon monoxide at an elevated pressure of from 10 to 35 atm., relatively low temperature of from 450° C. to 600° C. and a high space velocity of from 5,000 to 20,000 eventually after preheating through an alumina catalyst containing from 2 to 10% thoria and a small quantity of sulphate ions.

We have then found that the used, inactivated catalyst can be easily and almost fully regenerated by treating with sulfuric acid. The space velocity as employed herein means the number of liters of reactant gas mixture at 30° C. and atmospheric pressure which passes over one liter of catalyst per hour. By means of the present combination of catalyst, pressure, reaction temperature and space velocity the decomposition of ammonia is substantially completely eliminated. The space time yield reaches then almost ten times that of the usual synthesis. On account of the relatively low reaction temperature according to the present invention the yield of hydrogen cyanide on one time passing is nearly by 10% lower than that of the usual synthesis. The space time yield is, however, proportional to the product of the yield on one time passing and the space velocity. The space time yield may be, therefore, raised nearly ten times that of the usual synthesis, if the space velocity is tenfolded. There remain in this case moreover the advantages of maintaining the reaction ratio at equilibrium and cheap cost of reaction vessels.

In accordance with the present invention the catalyst is prepared, for example, as follows. Crystallized thorium nitrate is dissolved in 10% aqueous solution of pure ammonium alum. Thorium nitrate is added in amount such that thoria contained in the catalyst amounts to 3% of the alumina quantity. An adequate quantity of 3% ammoniacal water is then added to the solution. The precipitate obtained is fully dried at a temperature a little above room temperature and roasted at a temperature of from 650° to 750° for three hours. The granular catalyst thus obtained contains a small amount usually about 2% of sulphate ion (calculated on the basis of sulfuric acid) and 3% of thoria and has an apparent density of from 0.8 to 1.0. The catalyst according to the present invention is much more active than customary alumina-thoria-catalyst and enables one, without decomposition of reaction gases, to obtain a cyanide yield which corresponds approximately to the equilibrium ratio by means of the present combination of pressure, temperature and space velocity. However, the catalyst is hard and durable and can easily be regenerated.

The following non-limiting examples are given to illustrate the present invention.

*Example 1*

15 g. of aforesaid catalyst (volume 17 cc.) are placed in a quartz tube (inside diameter 1.7 cm. and length 67 cm.), which is wound with Ni-Cr-wire and heat-insulated with asbestos coating. There is passed through the tube a gas mixture, which consists of 90.4% carbon monoxide, 9.1% ammonia, 0.4% nitrogen and 0.1% oxygen (as impurities) at absolute pressure of 15 atm. The reaction temperature is thereby maintained at 550° C. and the space velocity at 5,300. There is then obtained a cyanide yield of 53%, which is close to the yield at equilibrium of 56% and there was no decomposition of ammonia.

Example 2

30 g. of the catalyst aforementioned are placed in a copper tube of same dimensions as in Example 1. The reaction temperature is maintained at 550° C. and the space velocity at 11,500. A gas mixture consisting of 89.8% carbon monoxide, 9.7% ammonia, 0.4% nitrogen and 0.1% oxygen is passed through the tube at a pressure of 20 atm. There is then obtained a cyanide yield of 50%, which approaches the yield at equilibrium of 54%. No decomposition of ammonia is observed.

Following examples of the usual synthesis are shown for comparison.

(a) A gas mixture consisting of 90.9% carbon monoxide and 9.1% ammonia is allowed to react at a reaction temperature of 650° C. under atmospheric pressure and otherwise under the same conditions as in Example 1. The maximum space velocity, which is required to maintain the cyanide yield at equilibrium of 61%, amounts to 1,200 only. There is observed almost no decomposition of ammonia.

(b) At a reaction temperature of 550° C. (and otherwise under same conditions as in Example a), the maximum space velocity, which is required to maintain the cyanide yield at equilibrium of 56.6%, amounts to only 400.

(c) At a reaction temperature of 550° C., space velocity of 5,300 (the same as in Example 1), there is obtained a yield of 24%. No decomposition of ammonia is observed.

(d) At a reaction temperature of 550° C., catalyst quantity of 30 g. and space velocity of 11,500 (the same as in Example 2), there is obtained a yield of 18%. There exists no decomposition of ammonia.

(e) The same quartz tube as in Example 1 is filled with 5 g. catalyst (5.5 cc.). At a reaction temperature of 650° C. and space velocity of 5,500, a gas mixture consisting of 90.5% carbon monoxide, 9.0% ammonia, 0.4% nitrogen and 0.1% oxygen is passed through the tube at a pressure of 10 atm. abs. There is obtained a yield of 21%, which is much lower than that at equilibrium. 72% of the ammonia is decomposed.

Examples a–e reveal the fact, that the maximum space velocity, at which the yield at equilibrium may be maintained under atmospheric pressure, must amount only to 1,200 even at 650° C.

Example e indicates, that ammonia is decomposed to a very great extent at the same temperature and the raised pressure (10 atm.) and the yield becomes much lower than that at equilibrium.

From Examples 1 and 2 it is made clear that a higher yield, which is nearly equal to that at equilibrium, may be obtained by means of the present combination of catalyst, relatively low reaction temperature, raised pressure and much higher space velocity, than is possible by the usual manner of synthesis.

The present catalyst, which, for example, has lost its activity by 20% after long use at 650° C., is cooled, impregnated with diluted sulfuric acid, and then roasted at 650°–750° C. for three hours, whereby the activity is regenerated easily and durably nearly to the full extent.

Having thus described the invention what is claimed as new and desired to be secured by Letters Patent is:

1. The process for the manufacture of hydrogen cyanide which comprises contacting a gaseous mixture comprising carbon monoxide and ammonia at elevated temperature with a catalyst comprising alumina, a small amount of sulphate ions and from about 2 to about 10% thoria at a pressure between about 10 and about 35 atmospheres and a space velocity between about 5,000 and 20,000 on an hourly basis.

2. The process according to claim 1, in which the catalyst contains about 2% sulphate ions, and including the additional steps of regenerating spent catalyst by contacting the same with sulphuric acid and returning the thus treated catalyst for contact with additional gaseous mixture.

3. The process for the manufacture of hydrogen cyanide which comprises contacting a gaseous mixture comprising carbon monoxide and ammonia with a catalyst comprising alumina, a small amount of sulphate ions and from about 2 to 10% thoria at a temperature between about 450° and less than 600° C. at a pressure between about 10 and about 35 atmospheres and at a space velocity above about 5,000 on an hourly basis.

4. The process for the manufacture of hydrogen cyanide which comprises contacting a gaseous mixture comprising carbon monoxide and ammonia with a catalyst comprising alumina, a small amount of sulphate ions and from about 2 to 10% thoria at a temperature above about 450° and below 600° C. at a pressure greater than 1 atmosphere and at a space velocity between about 5,000 and about 20,000 on an hourly basis.

References Cited in the file of this patent
UNITED STATES PATENTS

| | | |
|---|---|---|
| 1,627,144 | Bredig et al. | May 3, 1927 |
| 2,003,477 | Woodhouse | June 4, 1935 |
| 2,414,736 | Gray | Jan. 21, 1947 |

OTHER REFERENCES

Chemical Abstracts, vol. 49, No. 11, May 25, 1955, page 7201.